UNITED STATES PATENT OFFICE.

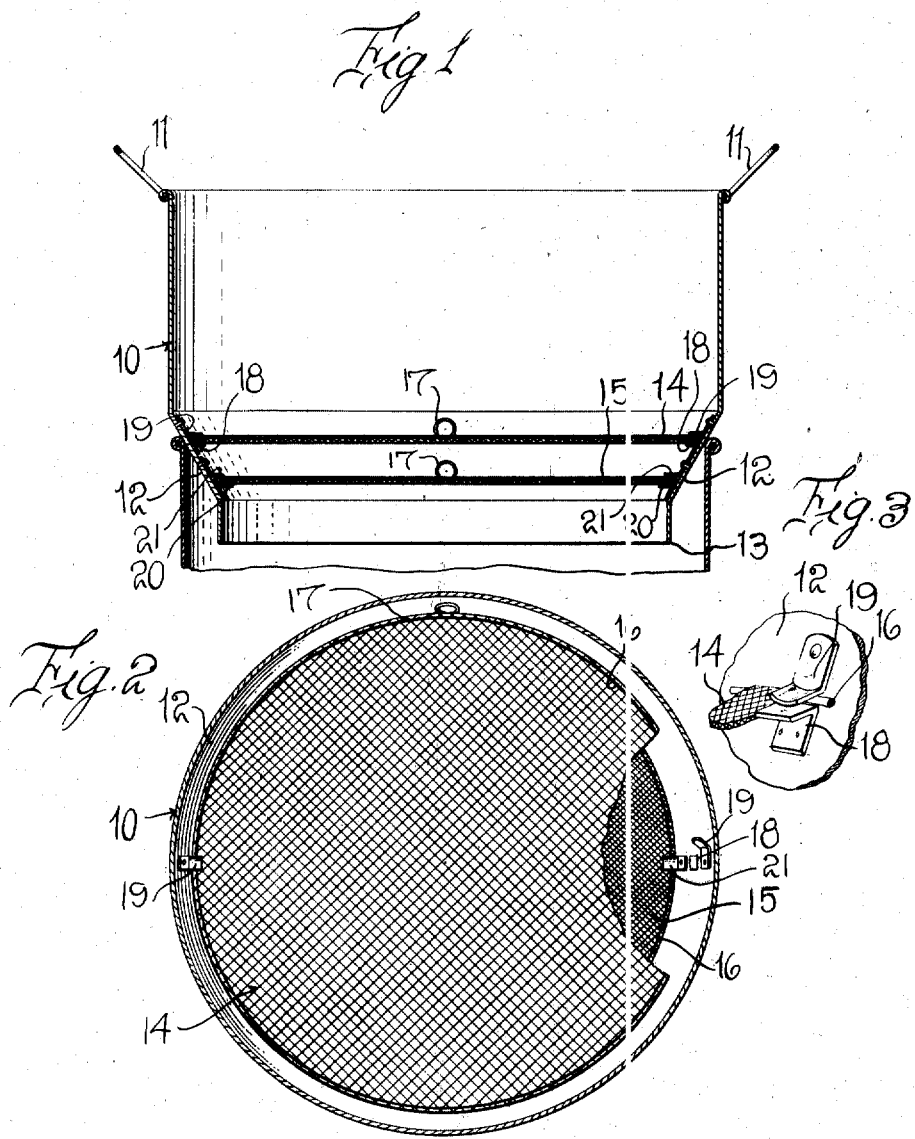

DERK GREVEN, OF HENNING, MINNESOTA.

STRAINER FOR LIQUIDS.

1,216,112.

Specification of Letters Patent.

Patented Feb. 13, 1917.

Application filed November 8, 1916. Serial No. 130,236.

*To all whom it may concern:*

Be it known that I, DERK GREVEN, a citizen of the United States, residing at Henning, in the county of Ottertail and State of Minnesota, have invented certain new and useful Improvements in Strainers for Liquids, of which the following is a specification, reference being had to the accompanying drawings.

This invention relates to devices for straining liquids and particularly to strainers designed to be used on top of milk cans or like articles.

The general object of my invention is the provision of a very simple and cheaply constructed strainer which is thoroughly sanitary and which may be taken apart so that the screens used therein may be cleansed.

A further object of the invention is the provision of means for holding the screens in place, said means, however, permitting the ready removal of the screens.

My invention is illustrated in the accompanying drawings, wherein—

Figure 1 is a diagrammatic sectional view of a strainer constructed in accordance with my invention;

Fig. 2 is a section across the body of the strainer above the uppermost strainer 14;

Fig. 3 is a fragmentary perspective view of a portion of the side wall of the strainer and the latches for holding the gauze screen in place.

Referring to these figures, 10 designates the body of the strainer which is circular in plan and which is made of metal or other suitable material, the body being provided with the handles or bails 11 whereby it may be readily manipulated. The body is cylindrical for a portion of its length and then tapers downward as at 12 and then is formed with a downwardly extending flange 13 which is of a size to permit the body to be inserted within the upper open end of the milk can for instance. Adapted to be disposed within the body are a plurality of strainers. Two of these strainers are shown, one being designated 14 and the other 15. The strainer 14 is of relatively coarse mesh while the strainer 15 is of relatively fine mesh. Both of these strainers may be made of wire gauze, or like material, and this gauze is supported upon a supporting ring 16 having a handle 17 whereby the strainer may be readily removed, the handle being attached to the ring 16 in any suitable manner.

For the purpose of supporting the strainers within the body 10, I provide at a plurality of points around the body the ledges 18, upon which the strainer 14 is adapted to be supported, and mount above these ledges the catches 19 which are pivoted so that they may be turned upward to permit the removal of the strainer but which when turned downward turn the strainer against the seats formed by the ledges 18. For the purpose of supporting the strainer 15 I provide a plurality of ledges or lugs 20 and pivot above these lugs the latches 21. These latches are of the same character as those previously described.

It will be seen that the tapering wall 12 is a necessity to permit the ready removal of the strainers inasmuch as the seats 18 and 20 are mounted upon this tapering wall. It is obvious that the strainers may be drawn upward through the body 10 without engaging the wall and without difficulty. Both of the strainers 14 and 15 can be taken out for cleaning whenever desired. The coarse strainer 14 is intended to eliminate hairs and any relatively large particles of dirt or foreign matter which may be in the milk, while the second strainer 15 will entirely clear the milk of foreign matter. It will be understood that the strainer body 10 will be in two or more sizes so that one size may be used for milk cans and the other for separators or milk pails.

As illustrated best in Fig. 3, the latches 19 are formed of angular pieces which are pivoted to the wall on the inclined portion 12. Thus when the latches are turned up, the upper ends of the latches are also shifted outward because of the movement of the latch on the inclined wall and thus the angular end of the latch is displaced sufficiently to permit the strainer to be readily removed.

Having described my invention, what I claim is:

1. A strainer of the character described comprising a hollow body open at its top and bottom, the lower portion of the body being gradually contracted and formed with a downwardly extending flange, a plurality of ledges projecting out from the contracted portion of the body at different heights, a plurality of strainers adapted to rest upon said ledges and extend across the body, and pivoted latches mounted upon the wall of the body and adapted to engage over the circumferences of the strainers to hold them in place, said latches being movable to an inoperative position permitting the vertical movement of the strainers with which the latches engage.

2. A strainer of the character described comprising a hollow body open at its top and bottom, the lower portion of the body being gradually contracted or tapered, a plurality of ledges projecting out from the contracted portion of the body, a strainer adapted to rest upon said ledges and extend across the body, and angular latches pivoted upon the inclined wall of the body and when turned down adapted to engage over the circumference of the strainer to hold it in place and against said ledges, the latches when turned to release the strainer being displaced sufficiently to permit the removal of the strainer.

In testimony whereof I hereunto affix my signature in the presence of two witnesses.

DERK GREVEN.

Witnesses:
G. C. St. Erin,
Lee C. Aldrich.

Copies of this patent may be obtained for five cents each, by addressing the "Commissioner of Patents, Washington, D. C."